US009228672B2

(12) United States Patent
Hiyama et al.

(10) Patent No.: US 9,228,672 B2
(45) Date of Patent: Jan. 5, 2016

(54) ELECTROMAGNETIC VALVE AND FIXING STRUCTURE

(71) Applicant: Hitachi Automotive Systems, Ltd, Hitachinaka-shi, Ibaraki (JP)

(72) Inventors: Shunsuke Hiyama, Sagamihara (JP); Ryohei Kobayashi, Atsugi (JP); Yasuhide Takada, Atsugi (JP); Kei Harada, Hiratsuka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 220 days.

(21) Appl. No.: 13/756,143

(22) Filed: Jan. 31, 2013

(65) Prior Publication Data

US 2013/0200284 A1 Aug. 8, 2013

(30) Foreign Application Priority Data

Feb. 3, 2012 (JP) .................................. 2012-021486

(51) Int. Cl.
*F16K 31/06* (2006.01)
*F16K 27/04* (2006.01)

(52) U.S. Cl.
CPC ........... *F16K 31/0675* (2013.01); *F16K 27/048* (2013.01)

(58) Field of Classification Search
CPC F16K 31/0675; F16K 31/0603; F16K 27/048
USPC .......................... 251/129.15, 367; 137/625.25
See application file for complete search history.

(56) References Cited

U.S. PATENT DOCUMENTS

| 4,988,074 A | * | 1/1991 | Najmolhoda | ............. 251/129.15 |
| 6,209,563 B1 | * | 4/2001 | Seid et al. | ................. 137/625.65 |
| 2004/0113112 A1 | | 6/2004 | Hirata et al. | |
| 2005/0189510 A1 | * | 9/2005 | Golovatai-Schmidt et al. | ........................ 251/129.15 |

FOREIGN PATENT DOCUMENTS

JP  2010-71359 A  4/2010

OTHER PUBLICATIONS

Takada et al, JP 2010-71359 English Translation, Published Apr. 2, 2010.*

* cited by examiner

*Primary Examiner* — John Bastianelli
(74) *Attorney, Agent, or Firm* — Crowell & Moring LLP

(57) ABSTRACT

An electromagnetic valve has: a coil; a casing encircling the coil and having a cylinder portion and nail portions; a movable core moving axially in the wound coil; a fixed core set at an opening end of the casing; a valve body fixed to the opening end of the casing together with the fixed core by bending inwards the nail portions; and a spool valve body moving axially in the valve body. The nail portion is provided with a wide width portion at a root side, a narrow width portion at a top side and a stepped portion between the wide width portion and the narrow width portion. The stepped portion is positioned at a substantially same position as an outer edge of one end portion of the valve body, or positioned at a cylinder portion side with respect to the one end portion outer edge of the valve body.

5 Claims, 6 Drawing Sheets

ELECTROMAGNETIC VALVE AND FIXING STRUCTURE

BACKGROUND OF THE INVENTION

The present invention relates to an electromagnetic valve and a fixing structure used for, for instance, a variable valve timing control apparatus of an internal combustion engine.

A related art electromagnetic valve has been disclosed in, for example, Japanese Patent Provisional Publication No. 2010-071359 (hereinafter is referred to as "JP2010-071359").

This electromagnetic valve is a valve that is provided at a cylinder head of the internal combustion engine and used for supply/exhaust control of working fluid (hydraulic oil) by switching an oil passage of a hydraulic circuit leading to the variable valve timing control apparatus. The electromagnetic valve is formed into a substantially bottomed cylindrical shape, and has a valve body slidably housing, inside thereof, a spool valve body and an electromagnetic solenoid fixed to an axial direction one end portion of the valve body.

The electromagnetic solenoid mainly has a casing that is a cylindrical magnetic material, a coil that is housed and positioned inside the casing, two fixed cores that are provided at axial direction front and rear ends of the casing, a substantially cylindrical column-shaped movable core that is slidably set in a cylindrical member provided at an inner circumference of the coil, and a non-magnetic material driving shaft that is provided at a front end side of the movable core and presses the spool valve body against a spring force of a return spring.

Front and rear ends of a body (a cylinder portion) of the casing are open, and the casing is provided, at the front end side, with a plurality of nail portions formed integrally with the casing. When assembling each component, the fixed core at the front end side is fixed with each nail portion bent inwards.

SUMMARY OF THE INVENTION

In a case of the related art electromagnetic valve in JP2010-071359, however, a width of each nail portion of the casing is substantially same from a root part up to a top end part of the nail portion, namely that each nail portion is formed into a rectangular shape. A bending point, upon crimping, of the nail portion thus becomes the root part, in other words, the nail portion is bent at the root part of the nail portion. Since this root part is positioned close to a height of the fixed core, this makes the bending harder.

That is, each nail portion has a relatively great width, thereby increasing rigidity of the whole nail portion. Then, since the bending point, upon crimping, of the nail portion is positioned close to the height of the fixed core, a force upon crimping acts on an edge of the fixed core which is the bending point, and the force is dispersed or spread inwards in a direction perpendicular to the axis. As a consequence, not only a squeezing or a gripping force of the crimping is not adequately obtained, but also there is a risk that the edge of the fixed core will be greatly deformed.

It is therefore an object of the present invention to provide an electromagnetic valve that is capable of suppressing the deformation of a member, e.g. the fixed core, which is crimped with the nail portion, while adequately securing the squeezing force of the crimping.

According to one aspect of the present invention, an electromagnetic valve comprises: an annularly-wound coil; a casing that encircles an outer peripheral side of the coil and has (a) a cylinder portion, at least one end side in an axial direction of which is open; and (b) a plurality of nail portions which are formed integrally with the opening end of the cylinder portion, a movable core that is housed movably in the axial direction in an inner periphery of the coil; a fixed core that is set at the opening end side of the casing; a hollow valve body that is fixed to the opening end of the casing together with the fixed core by bending inwards and deforming the nail portions; and a spool valve body that moves in the axial direction in the valve body according to the movement in the axial direction of the movable core. And the nail portion is provided with (c) a wide width portion formed at a root side of the nail portion; (d) a narrow width portion formed at a top edge side of the wide width portion; and (e) a stepped portion formed between the wide width portion and the narrow width portion. And the stepped portion is positioned at a substantially same position as an outer edge of one end portion of the valve body which abuts on the fixed core from the axial direction, or is positioned at a cylinder portion side with respect to the one end portion outer edge of the valve body.

According to another aspect of the present invention, an electromagnetic valve comprises: an annularly-wound coil; a casing that encircles an outer peripheral side of the coil and has (a) a cylinder portion, one end side in an axial direction of which is open; and (b) a plurality of nail portions which are formed integrally with the opening end of the cylinder portion, a movable core that is housed movably in the axial direction in an inner periphery of the coil; a fixed core that is set at at least the opening end of the casing; a hollow valve body that is fixed to the opening end of the casing together with the fixed core by bending inwards and deforming the nail portions; and a spool valve body that moves in the axial direction in the valve body according to the movement in the axial direction of the movable core. And the nail portion has a structure in which a predetermined portion of the nail portion, which is positioned between a root part side of the nail portion and an outer edge in the axial direction of the valve body, is bent inwards and deformed more easily than the root part of the nail portion.

According to a further aspect of the invention, a fixing structure that fixes a second member to a first member, comprises: a plurality of nail portions formed at the first member, a top edge portion of the nail portion being deformed by crimping by which one end of the second member is crimped together with the top edge portion of the nail portion, and the nail portion is formed so that rigidity of a predetermined position at the top edge portion side of the nail portion is lower than that of a root part of the nail portion.

The other objects and features of this invention will become understood from the following description with reference to the accompanying drawings.

DETAILED DESCRIPTION OF THE INVENTION

Figure 1:
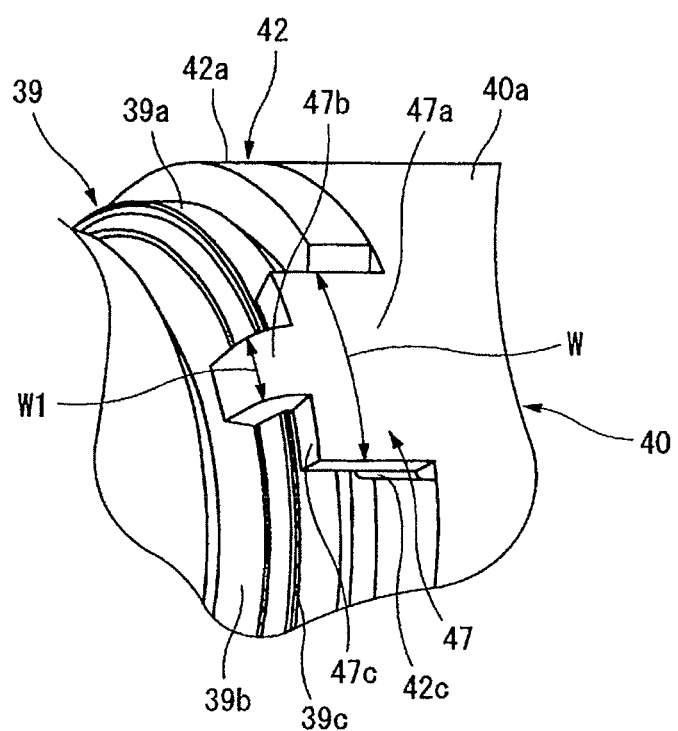
FIG. 1 is an enlarged view of a main part of an electromagnetic valve according to a first embodiment of the present invention.

According to the present invention, the crimping is performed by bending inwards and deforming each narrow width portion of a nail portion from a position of a stepped portion that is formed between a wide width portion and the narrow width portion of the nail portion with the nail portion being supported by and at the wide width portion that has high rigidity. A squeezing or a gripping force (a crimping force), in an axial direction, to a fixed core is thus increased, and it is possible to suppress the deformation of an edge of the fixed core.

Embodiments of an electromagnetic valve of the present invention will now be explained below with reference to the drawings.

First Embodiment

In a first embodiment, the electromagnetic valve is applied to a vane-type variable valve timing control apparatus of an internal combustion engine.

The variable valve timing control apparatus will be briefly explained with reference to FIG. 2. The variable valve timing control apparatus has a timing sprocket 1 that is driven and rotates by an engine crankshaft (not shown) through a timing chain, a camshaft 2 that is capable of rotating relative to the timing sprocket 1, a relative angular phase control mechanism (simply, a phase converter or a phase-change mechanism) 3 disposed between the timing sprocket 1 and the camshaft 2 and changing or controlling a relative rotational position between the timing sprocket 1 and the camshaft 2, and a hydraulic circuit 4 that actuates the phase-change mechanism 3.

The camshaft 2 is rotatably supported by a cylinder head (not shown) through a camshaft bearing. The camshaft 2 has a plurality of driving cams, each of which actuates an intake valve through a valve lifter. Each driving cam is formed integrally with the camshaft 2 at a certain position on an outer peripheral surface of the camshaft 2.

The phase-change mechanism 3 has a cylindrical housing 5 provided at and fixedly connected to an inner circumference side of the timing sprocket 1, a vane member 6 secured to one end portion of the camshaft 2 from an axial direction by a cam bolt and relatively rotatably housed in the housing 5, four shoes 7 formed integrally with an inner peripheral surface of the housing 5, four vanes 8 formed integrally with the vane member 6, and four retard oil chambers 9 and four advance oil chambers 10. As can be seen in FIG. 2, the retard and advance oil chambers 9 and 10 are divided and defined by the four shoes 7 and the four vanes 8.

The housing 5 has a front plate and a rear plate (both not shown) which close a front side opening end and a rear side opening end of the housing 5 respectively. These housing 5 and front and rear plates are tightened together in the axial direction by four bolts 11, then fixedly connected together.

Each shoe 7 has a substantially trapezoidal shape in cross section. Further, a seal groove is formed on a top end part of the trapezoidal shape along the axial direction, and an almost square bracket ("]")-shaped seal member 12 is fitted in the seal groove.

The vane member 6 is formed as an integral part by metal material. The vane member 6 has a vane rotor 6a and the four vanes 8. The vane rotor 6a is secured to the one end portion of the camshaft 2 from the axial direction by the cam bolt with the cam bolt inserted into an insertion hole that is formed in the middle of the vane member 6. The four vanes 8 are arranged at almost regular intervals in a circumferential direction of an outer peripheral surface of the vane rotor 6a, and protrude in a radial direction.

The vane rotor 6a is rotatably supported by the seal member 12 fitted in the seal groove on an upper surface of the top end part of each of the shoes 7 while making sliding contact with the seal member 12. The vane rotor 6a is provided with four retard side oil paths or holes (not shown) that communicate with the respective retard oil chambers 9 in the radial direction and four advance side oil paths or holes (not shown) that communicate with the respective advance oil chambers 10 in the radial direction.

Each of the vanes 8 is placed between the adjacent two shoes 7. A seal groove is formed on a top end surface of each vane 8 along the axial direction, and an almost square bracket ("]")-shaped seal member 14 that makes sliding contact with the inner peripheral surface of the housing 5 is fitted in the seal groove. Further, a locking mechanism 15 that restrains free rotation of the vane member 6 at a most-retarded angle side as shown in FIG. 2 is provided between the vane 8 having a maximum width and the rear plate.

Figure 2:
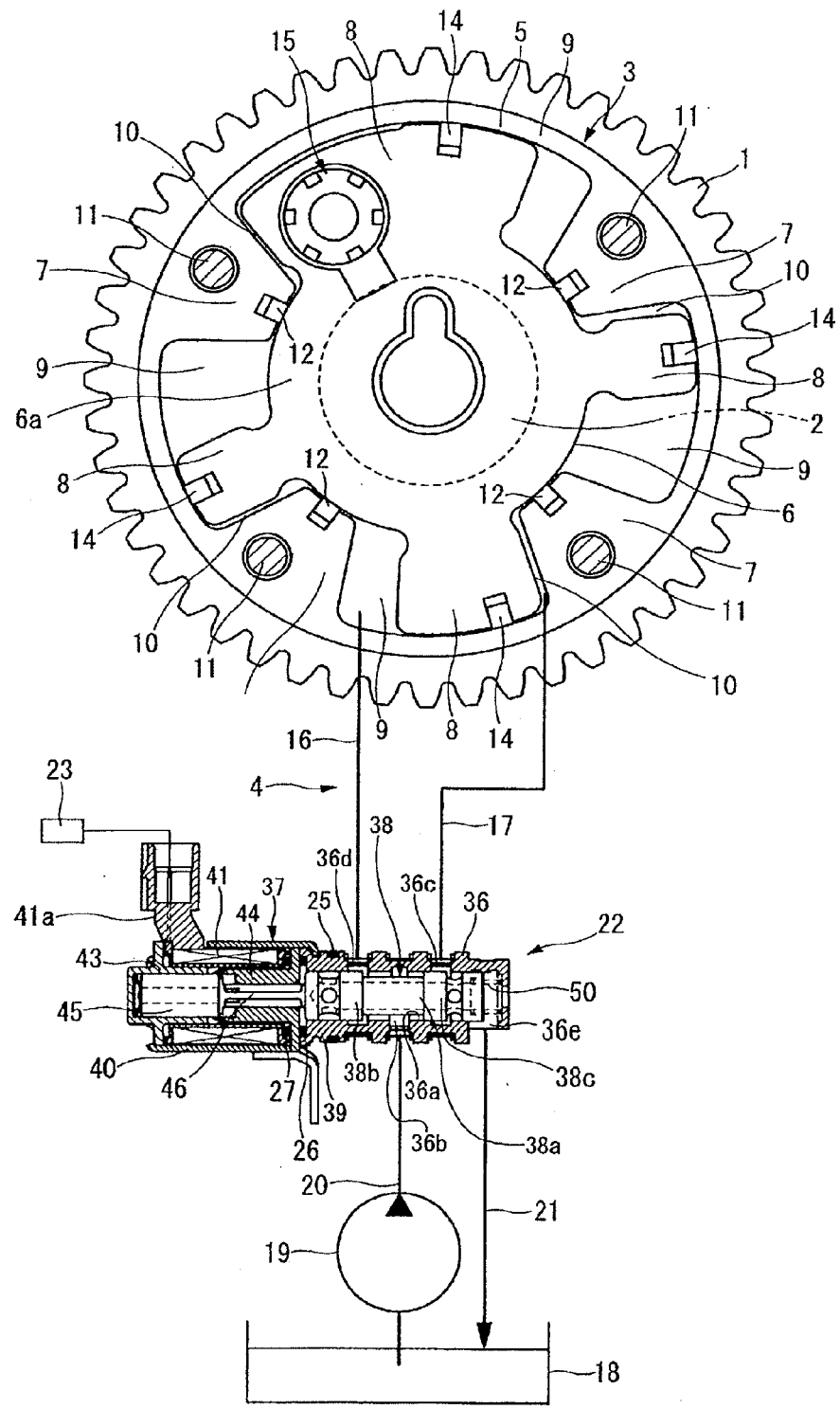
FIG. 2 is a schematic view of a variable valve timing control apparatus that employs the electromagnetic valve of the present embodiment.

The hydraulic circuit 4 has, as shown in FIG. 2, first and second oil passages 16 and 17 that communicate with each retard oil chamber 9 and each advance oil chamber 10 through each retard side oil passage and each advance side oil passage respectively, an oil pump 19 that supplies working fluid (hydraulic oil) reserved in an oil pan 18 into each of the retard oil chambers 9 and the advance oil chambers 10 through the first and second oil passages 16 and 17, and an electromagnetic valve 22 that is provided at a downstream side of the oil pump 19 and selectively switches oil passages with which the first and second oil passages 16 and 17 communicate between a pump discharge oil passage 20 and an oil drain passage 21 by a control signal from an electronic controller 23.

As shown in FIGS. 2 to 6, this electromagnetic valve 22 is a direction switching valve that switches ON/OFF of the oil passage. The electromagnetic valve 22 mainly has a cylindrical (a hollow) valve body 36 inserted into and fixed to a valve accommodation hole that is formed at the cylinder head (not shown), an electromagnetic solenoid 37 provided at one end side of the valve body 36, and a spool valve body 38 housed movably (slidably) in the axial direction inside the valve body 36 and moving by being pressed by an after-mentioned armature 45 that is a movable core moving to the electromagnetic solenoid 37 side by a driving force of the electromagnetic solenoid 37.

The valve body 36 has, inside thereof, a valve hollow 36a for housing the spool valve body 38, and an oil supply port 36b at a substantially middle position on an peripheral wall of the valve body 36. The oil supply port 36b is formed in the radial direction and opens to the valve hollow 36a. Further, first and second output ports 36c and 36d which individually communicate with the first and second oil passages 16 and 17 respectively are provided at both side positions of the oil supply port 36b. These first and second output ports 36c and 36d are formed in the radial direction and open to the valve hollow 36a. Furthermore, a drain port 36e which communicates with the oil pan 18 through the oil drain passage 21 is formed along the radial direction at a side position of the first output port 36c. Here, each of the ports is provided, at an outer circumference thereof, with a ring-shaped filter 24a to 24c for filtering dust and contaminant and the like.

To seal a gap between the valve accommodation hole and the valve body 36, a seal ring 25 is fitted and fixed onto an outer circumference of a base end portion 39, at the electromagnetic solenoid 37 side, of the valve body 36. Also, to seal a gap between an after-mentioned casing 40 and the valve body 36 (the base end portion 39), a seal ring 26 is fitted and fixed to a top end side of the base end portion 39.

Figure 5:
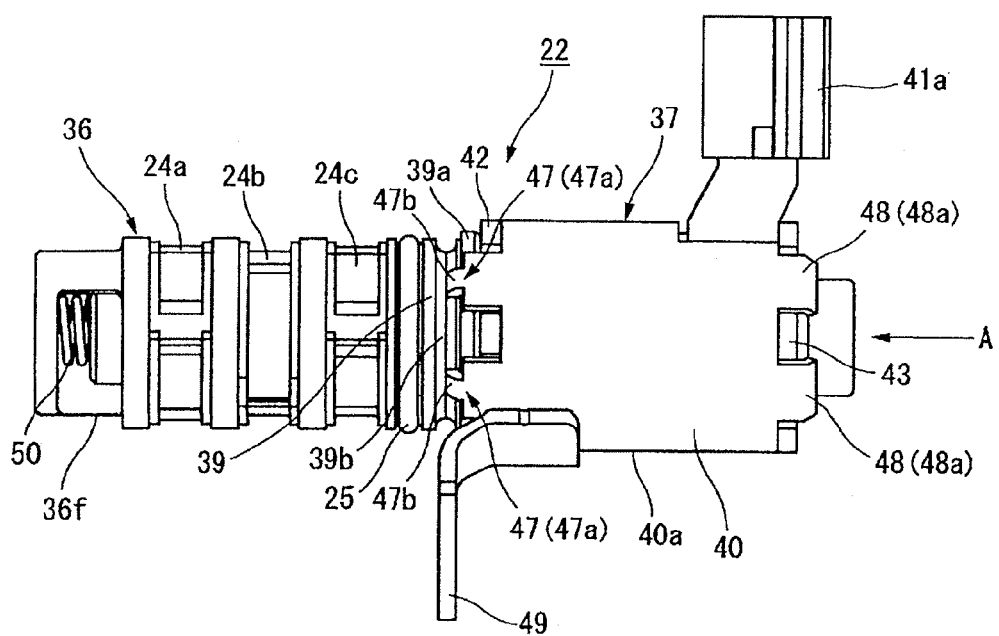
FIG. 5 is a side view of the electromagnetic valve of the present embodiment.
Figure 6:
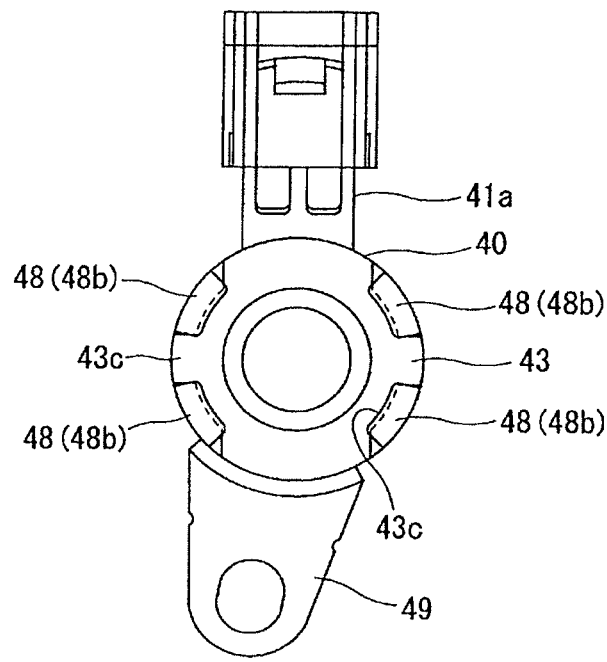
FIG. 6 is a drawing viewed from an arrow A in FIG. 5.

As shown in FIG. 1, the valve body 36 has a flange shaped ring portion 39a at an edge side, at the electromagnetic solenoid 37 side, of the base end portion 39. The ring portion 39a is formed integrally with the valve body 36 (the base end portion 39), and makes contact with an after-mentioned first fixed yoke 42 from the axial direction. In addition, the valve body 36 has a ring-shaped stopper groove 39b at a side part of the ring portion 39a. As will be explained later, a narrow width portion 47b of a first nail portion 47 (both described later) stops at or grips this stopper groove 39b by making contact with this stopper groove 39b by crimping. Here, as shown in FIG. 5 also FIG. 4, a breathing vent 36f to ensure good sliding performance of the spool valve body 38 is formed at a bottom wall of the valve body 36.

The spool valve body 38 is formed as an integral part by metal material. As shown in FIG. 2, the spool valve body 38 is provided, on an outer peripheral surface of a valve shaft 38a, with two cylindrical column-shaped first and second land portions 38b and 38c. The first and second land portions 38b and 38c are formed integrally with the spool valve body 38 (the valve shaft 38a) at a certain interval, and selectively open/close the oil supply port 36b, the first and second output ports 36c and 36d and the drain port 36e according to moving positions of the first and second land portions 38b and 38c.

Figure 3:
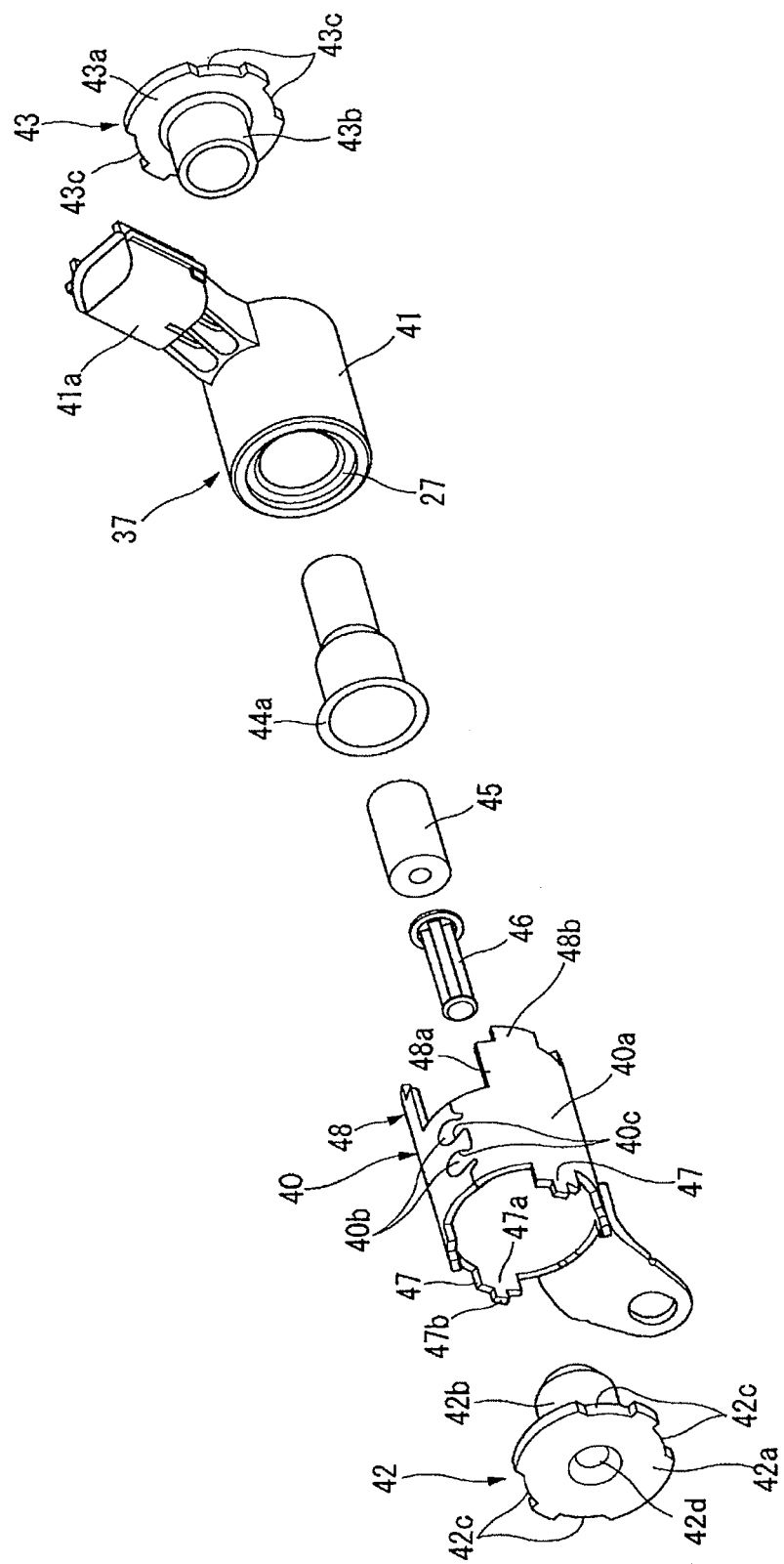
FIG. 3 is a perspective exploded view showing an electromagnetic solenoid that is provided in the electromagnetic valve.
Figure 4:
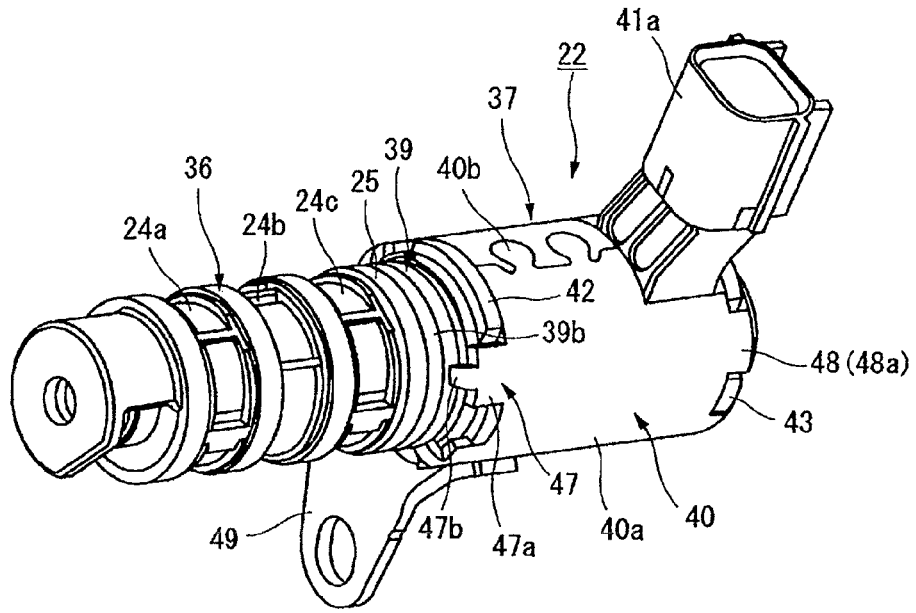
FIG. 4 is a perspective view of the electromagnetic valve of the present embodiment.

The electromagnetic solenoid 37 mainly has, as shown in FIG. 3, the substantially cylindrical casing 40 made of magnetic material, a cylindrical electromagnetic coil (an annularly-wound coil) 41 set at an inner periphery of the casing 40, first and second fixed yokes 42 and 43 which are two fixed cores fixed to front and rear opening ends of the casing 40 by the crimping and demagnetized/magnetized by the electromagnetic coil 41, the armature 45 housed movably (slidably) in the axial direction inside a tubular yoke 44 that is arranged and fixed between both the fixed yokes 42 and 43, and a non-magnetic material shaft 46 provided slidably in an axial hole of the first fixed yoke 42.

The casing 40 is formed into the cylindrical shape by rounding a magnetic material plate or sheet. As can be seen in FIG. 3, two round engaging convex portions 40b and two round engaging concave portions 40c corresponding to the round engaging convex portions 40b, which are formed at opposing ends, in a circumferential direction, of the cylindrical shaped magnetic material plate, are engaged or fitted with each other and joined together. A body (a cylinder portion) 40a of the casing 40 is then formed with front and rear ends of the cylinder portion 40a open.

The front side opening end of the cylinder portion 40a is provided with four first nail portions 47 for fixing the first fixed yoke 42 by the crimping, while the rear side opening end of the cylinder portion 40a is provided with four second nail portions 48 for fixing the second fixed yoke 43 by the crimping. The first and second nail portions 47 and 48 are formed integrally with the respective opening ends of the cylinder portion 40a, and protrude from the respective opening ends.

As shown in FIGS. 1, 3 to 6, the first and second nail portions 47 and 48 are formed into a convex shape that protrudes from the front and rear edges of the cylinder portion 40a respectively. Further, two first nail portions 47 are arranged, as a pair, at right and left positions which are 180-degree positions in the circumferential direction of the front side opening end. The remaining two first nail portions 47 are also arranged, as a pair, at right and left positions which are 180-degree positions in the circumferential direction of the front side opening end. Likewise, two second nail portions 48 are arranged, as a pair, at right and left positions which are 180-degree positions in the circumferential direction of the rear side opening end. The remaining two second nail portions 48 are also arranged, as a pair, at right and left positions which are 180-degree positions in the circumferential direction of the rear side opening end.

As shown in the drawings, the first and second nail portions 47 and 48 extend along the axial direction of the cylinder portion 40a. The protruding first and second nail portions 47 and 48 have rectangular wide width portions 47a and 48a that are positioned at the cylinder portion 40a side, narrow width portions 47b and 48b that are formed integrally with the wide width portions 47a and 48a in the substantially middle at top edges of the wide width portions 47a and 48a, and stepped portions 47c and 48c that are shoulder portions formed between the wide width portions 47a, 48a and the narrow width portions 47b, 48b.

A width W1 of each of the narrow width portions 47b and 48b is set to approximately one-third width of a width W of each of the wide width portions 47a and 48a, then rigidity of the wide width portions 47a and 48a is higher than that of the narrow width portions 47b and 48b. That is, the wide width portions 47a and 48a having high rigidity and the narrow width portions 47b and 48b having low rigidity are divided or defined with the stepped portions 47c and 48c being the center or the middle. Therefore, when performing the crimping, the first and second nail portions 47 and 48 are bent inwards with positions of the stepped portions 47c and 48c being respective bending points (bending lines). On outer edges of top edge portions 47d and 48d of the narrow width portions 47b and 48b, tapered surfaces 47e and 48e are formed.

As shown in FIG. 1, each stepped portion 47c at the valve body 36 side is formed so as to be positioned at a substantially same position as an edge 39c at the stopper groove 39b side of the ring portion 39a of the base end portion 39 of the valve body 36 when assembling the casing 40 etc. On the other hand, each stepped portion 48c at the rear edge side is formed so as to be positioned at a substantially same position as an outer edge of an after-mentioned cutting groove 43c of the second fixed yoke 43.

Here, a fixing bracket 49 for being secured to the cylinder head is fixed on an outer side surface of the cylinder portion 40a of the casing 40.

As shown in FIG. 3, the first fixed yoke 42 and the second fixed yoke 43 has disk-shaped flange portions 42a and 43a and tubular portions 42b and 43b. The tubular portions 42b and 43b are formed integrally with the flange portions 42a and 43a at middle positions on inner surfaces, which are opposing surfaces in the axial direction, of the flange portions 42a and 43a. Further, four arc cutting grooves 42c and 43c are formed at substantially 180-degree positions in the circumferential direction of the flange portions 42a and 43a respectively.

The first fixed yoke 42 is provided, at a middle position of the flange portion 42a, with a shaft insertion hole 42d that penetrates the flange portion 42a and continues to an insertion hole of the tubular portion 42b. An outside diameter of each of the flange portions 42a and 43a is set to the substantially same outside diameter as the cylinder portion 40a of the casing 40. A width of each of the cutting grooves 42c and 43c is set to be slightly larger than a width of the wide width portions 47a and 48a of the first and second nail portions 47 and 48 so that the wide width portions 47a and 48a can be fitted to the cutting grooves 42c and 43c. Here, an outside diameter of the ring portion 39a of the base end portion 39 of the valve body 36 is set to be smaller than that of the flange portion 42a by a thickness of each first nail portion 47.

Further, a seal member 27 is inserted between an outer circumferential portion of the flange portion 42a of the first fixed yoke 42 and a front end flange 44a of the tubular yoke 44.

The electromagnetic coil 41 is energized/deenergized (ON/OFF) by the electronic controller 23 that is electrically connected to a terminal in a connector 41a provided at an outer periphery of the electromagnetic coil 41.

The armature 45 has a substantially cylindrical column-shape, and is set so as to move forward by the fact that each of the yokes 42, 43 and 44 is magnetized by the energization of the electromagnetic coil 41.

As shown in FIGS. 2 and 5, a compressed coil spring 50 is provided between the bottom wall of the valve body 36 and the spool valve body 38. The compressed coil spring 50 forces the spool valve body 38 to a left direction in FIG. 2, i.e. to an opposite direction to the moving direction of the magnetized armature 45.

The shaft 46 is made of the non-magnetic material. A base end of the shaft 46 is in abutted-contact with a top end of the armature 45, while a top end of the shaft 46 is in abutted-contact with one end of the spool valve body 38, then the shaft 46 moves in the axial direction by a relative pressure (a relative force) between the movement of the armature 45 and the compressed coil spring 50.

In the following description, operation of the variable valve timing control apparatus will be briefly explained. In a predetermined low rotation speed region from an extremely low rotation speed during an engine operation at idle and upon an engine start, the energization of the electromagnetic valve 22 by the electronic controller 23 is interrupted or shut off. Thus, the spool valve body 38 is held at a most leftward position shown in FIG. 2 by a spring force of the compressed coil spring 50. In this state, the first land portion 38b connects the oil supply port 36b and the second output port 36d, while the second land portion 38c shuts off a connection between the oil supply port 36b and the first output port 36c and connects the first output port 36c and the drain port 36e.

The working fluid pumped out by the oil pump 19 is then supplied to each retard oil chamber 9 through the first oil passage 16, while the working fluid in each advance oil chamber 10 is returned to the oil pan 18 from the second oil passage 17 through the drain port 36e and the oil drain passage 21.

The vane member 6 is thus held at a most leftward rotation position shown in FIG. 2, and the relative rotational position between the timing sprocket 1 and the camshaft 2 (a rotational phase of the camshaft 2 relative to the timing sprocket 1) is set to the most-retarded angle side. With this operation, good engine startability can be ensured, also stable engine rotation during the idle can be ensured.

When the engine operating condition shifts from the low rotation speed region to a middle rotation speed region which is a steady operating condition, an ON signal is outputted to the electromagnetic valve 22 from the electronic controller 23 and the electromagnetic valve 22 is energized, the armature 45 is then magnetized. The armature 45 consequently moves to a most rightward direction from the position shown in FIG. 2 against the spring force of the compressed coil spring 50, and moves the spool valve body 38 to the same direction.

As a consequence, by the first land portion 38b and the second land portion 38c, the first output port 36c communicates with the oil supply port 36b, and the connection with the drain port 36e is shut off. On the other hand, the connection between the second output port 36d and the oil supply port 36b is shut off, and the second output port 36d communicates with the drain port 36e.

The working fluid (hydraulic pressure) pumped out by the oil pump 19 is then supplied to each advance oil chamber 10 through the second oil passage 17 and an internal pressure of each advance oil chamber 10 becomes high, while the working fluid (the hydraulic pressure) in each retard oil chamber 9 is exhausted to the oil pan 18 and an internal pressure of each retard oil chamber 9 becomes low.

The vane member 6 thus rotates in a rightward direction from the rotation position shown in FIG. 2, and the relative rotational position between the timing sprocket 1 and the camshaft 2 (the rotational phase of the camshaft 2 relative to the timing sprocket 1) is converted to an advanced angle side. With this operation, open/close timing of the intake valve shifts to the advanced angle side, and good engine combustibility during the steady operating condition can be ensured, thereby increasing fuel economy and an engine output.

Further, when the engine operating condition shifts to a high rotation speed region, an OFF signal is outputted to the electromagnetic valve 22 (the electromagnetic solenoid 37) from the electronic controller 23 and the electromagnetic valve 22 is deenergized. The armature 45 then moves to the most leftward direction shown in FIG. 2 by the spring force of the compressed coil spring 50. As a consequence, in the same manner as the above, the spool valve body 38 connects the oil supply port 36b and the second output port 36d, and connects the first output port 36c and the drain port 36e.

The working fluid (the hydraulic pressure) is then supplied to each retard oil chamber 9 and its internal pressure becomes high, while the working fluid (the hydraulic pressure) in each advance oil chamber 10 is exhausted to the oil pan 18 and its internal pressure becomes low.

The vane member 6 thus rotates in the most leftward direction shown in FIG. 2, and the camshaft 2 (the rotational phase of the camshaft 2 relative to the timing sprocket 1) is set to a retarded angle side. With this operation, the open/close timing of the intake valve shifts to the retarded angle side, thereby increasing the engine output in a high rotation speed high load region.

In the present embodiment, when fixing the valve body 36 to the casing 40 through the first fixed yoke 42 by the crimping, the electromagnetic coil 41, the tubular yoke 44, the armature 45, the shaft 46, etc. are previously housed in the casing 40, and subsequently the first fixed yoke 42 is set while fitting each of the wide width portions 47a of the first nail portions 47 to the cutting groove 42c.

Figure 7A:
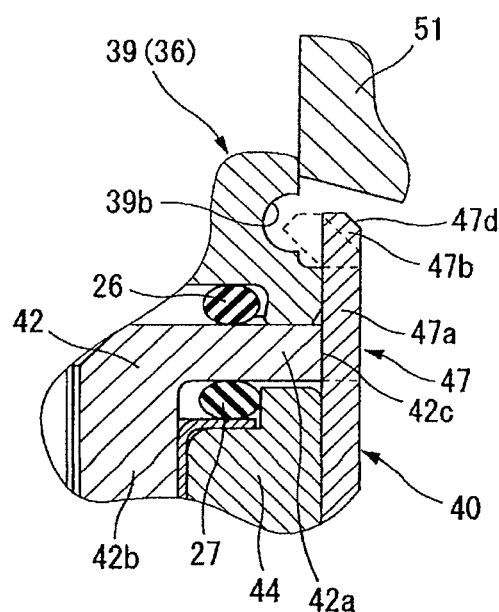
FIG. 7A is a sectional view of the main part, showing a state before performing crimping using a nail portion.

Then, as shown in FIG. 7A, the base end portion 39 of the valve body 36 is set between the first nail portions 47 while making an opposing end surface of the base end portion 39 abut on a front end surface of the flange portion 42a of the first fixed yoke 42 from the axial direction. At this time, each of the stepped portions 47c of the first nail portions 47 faces to an edge of the ring portion 39a, and each narrow width portion 47b is positioned at an outer side of the stopper groove 39b.

Figure 7B:
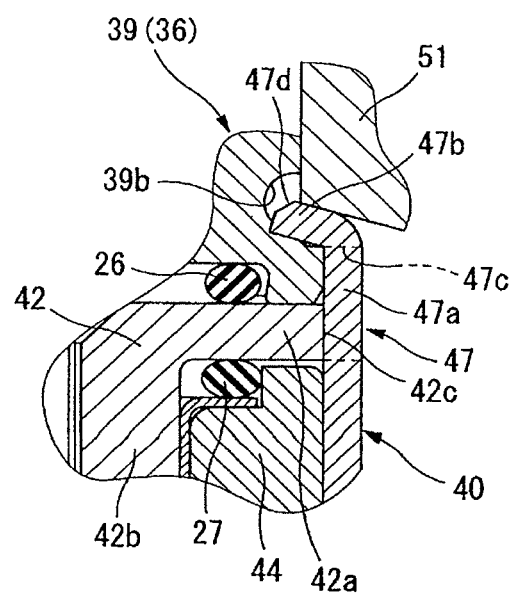
FIG. 7B is a sectional view of the main part, showing a state after performing the crimping.

Afterwards, as shown in FIG. 7B, by pressing the top edge portions 47d of the narrow width portions 47b of the first nail portions 47 from the axial direction with a crimping punch 51, its pressing force acts on each narrow width portion 47b in an inward direction through each tapered surface 47e. Each narrow width portion 47b having low rigidity is then bent inwards and deformed from or around the stepped portion 47c that is a base part or a root part. Therefore, each top edge portion 47d of the narrow width portion 47b is fitted (or inserted) to the stopper groove 39b and further is pressed against an inner surface of the stopper groove 39b, that is, a whole inner surface of the narrow width portion 47b is pressed against an outer surface of the ring portion 39a (i.e. the inner surface of the stopper groove 39b), and thus a squeezing force or a gripping force is exerted. By this crimping force (the squeezing force), the valve body 36 is firmly fixed to the casing 40 from the axial direction.

As explained above, when the top edge portion 47d of the narrow width portion 47b is pressed with the crimping punch 51, an inner surface of each wide width portion 47a having high rigidity abuts on a bottom surface of the cutting groove 42c of the first fixed yoke 42 and the outer surface of the ring portion 39a without deformation, then the wide width portion 47a having high rigidity supports or facilitates the inward deformation (the inward bending) of the narrow width portion 47b from the root part (i.e. from the stepped portion 47c) without deformation of the wide width portion 47a itself.

With this fixation, a strong force dose not acts on the edge 39c of the ring portion 39a around the stepped portion 47c that is the bending point (the bending line) of the narrow width portion 47b, but the crimping force is exerted on the outer surface of the ring portion 39a through the whole inner surface of the narrow width portion 47b. Consequently, it is possible to suppress the deformation of an edge of the first fixed yoke 42 while adequately securing the squeezing force of the crimping.

Although the fixation of the crimping of the first nail portion 47 side has been explained above, the fixation of the crimping of the second nail portion 48 side, in which the second fixed yoke 43 is crimped, is the same as that of the first nail portion 47 side even though the valve body 36 is not present at the second fixed yoke 43 side.

Here, in the present embodiment, although the width of the narrow width portion 47b is the same from the root part to the top end, it is possible to change the width. For instance, a shape from the stepped portion 47c to the narrow width portion 47b could be an arc.

The stepped portion 47c is a portion that does not continuously change the rigidity of the first nail portion 47 from the wide width portion 47a to the narrow width portion 47b, but brings a stepped change for the rigidity of the first nail portion 47 so that only the narrow width portion 47b is bent and deformed with respect to the wide width portion 47a.

In the present embodiment, the casing 40 corresponds to a first member, and the valve body 36 corresponds to a second member.

Second Embodiment

Figure 8:
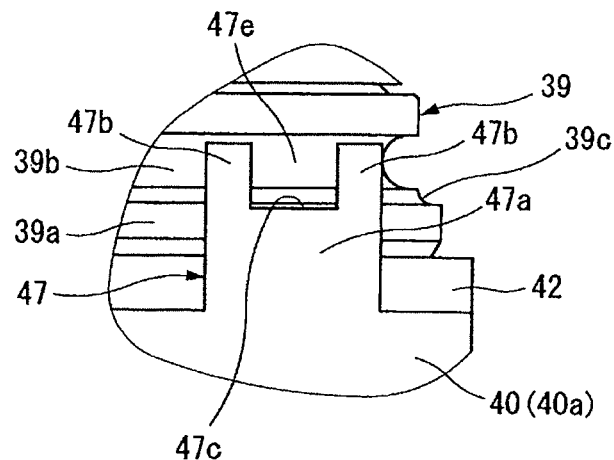
FIG. 8 is an enlarged view of the main part of the electromagnetic valve according to a second embodiment of the present invention.

FIG. 8 shows a second embodiment. In the second embodiment, two narrow width portions 47b, 47b are provided for each first nail portion 47. The narrow width portions 47b, 47b are formed at the top edge side of the wide width portion 47a, i.e. at both sides in a width direction of the stepped portion 47c, through an opening portion 47e.

Thus, the present embodiment also has the same effect as that of the first embodiment, and further has an effect of increasing the crimping force by providing the two narrow width portions 47b, 47b for each first nail portion 47.

Also in the second embodiment, the width of the narrow width portion 47b could be changed. For instance, the opening portion 47e might be formed into an arc or a semicircle.

Third Embodiment

Figure 9:
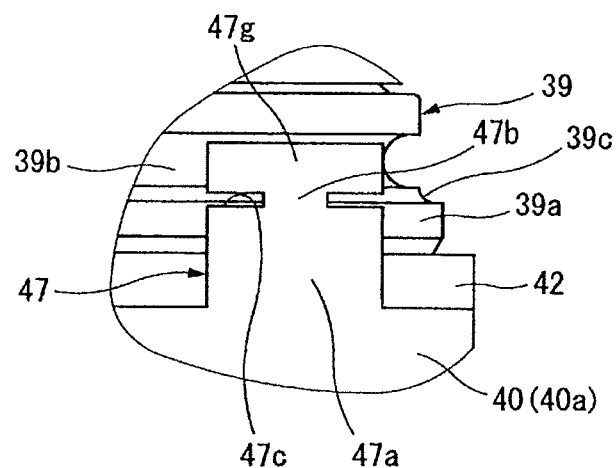
FIG. 9 is an enlarged view of the main part of the electromagnetic valve according to a third embodiment of the present invention.

FIG. 9 shows a third embodiment. In the third embodiment, the narrow width portion 47b is formed in the substantially middle, in a width direction, of the stepped portion 47c that is the top edge of the wide width portion 47a, and further an enlarged width portion 47g whose width is the same as that of the wide width portion 47a is formed integrally with a top edge of the narrow width portion 47b.

In the third embodiment, as same as the above embodiments, although the bending point (the bending line) upon the crimping is positioned around the root part of the narrow width portion 47b, i.e. around the stepped portion 47c, a pressing area of the bent enlarged width portion 47g which presses the outer surface of the ring portion 39a (i.e. the inner surface of the stopper groove 39b) becomes large. Hence, a stable or firm crimping force against the ring portion 39a can be provided.

In the third embodiment, the narrow width portion 47b is formed into a square bracket ("]")-shape between the wide width portion 47a and the enlarged width portion 47g by cutting, and the width of the narrow width portion 47b is the same. However, the narrow width portion 47b could be formed into an arc or a semicircle by the cutting.

The electromagnetic valve of the present invention is not limited to the electromagnetic valve having the structure or configuration of the above embodiments. Also the electromagnetic valve of the present invention is applied to not only the variable valve timing control apparatus and valve lift control apparatus of the internal combustion engine, but also used for an oil pressure control and an oil flow passage switching control of other equipment.

Further, besides the fixation of the electromagnetic valve, the present invention can be applied to a fixing structure in which two elements or components are fixed by the crimping.

Furthermore, as the fixation of the electromagnetic valve, it is a proportional control type valve, an ON/OFF type valve, a multistage type valve and the like.

From the foregoing, the present invention includes the following structure or configuration of the electromagnetic valve, and has the following effects.

(a) In the above embodiment, the casing 40 is formed into a cylindrical shape by rounding a plate member and joining opposing ends in circumferential direction of the plate member together.

According to the above electromagnetic valve, a forming process of the casing is easily performed.

(b) In the above embodiment, the casing (40) is made of magnetic material.

(c) In the above embodiment, two narrow width portions 47b, 47b are formed at the top edge both sides of the wide width portion 47a with an opening portion 47e provided between the two narrow width portions 47b, 47b.

According to the above electromagnetic valve, by providing the two narrow width portions 47b, 47b for each first nail portion 47, the crimping force is increased.

(d) In the above embodiment, the narrow width portion 47b is formed in a middle at the top edge side of the wide width portion 47a, and an enlarged width portion 47g whose width is the same as that of the wide width portion 47a is formed at a top edge of the narrow width portion 47b.

According to the above electromagnetic valve, since the pressing area of the bent enlarged width portion 47g which presses the outer surface of the ring portion 39a which is crimped together with first nail portion 47 (i.e. the inner surface of the stopper groove 39b) becomes large, the stable or firm crimping force against the ring portion 39a can be provided.

The entire contents of Japanese Patent Application No. 2012-21486 filed on Feb. 3, 2012 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An electromagnetic valve comprising:
    an annularly-wound coil;
    a casing that encircles an outer peripheral side of the coil and has
        (a) a cylinder portion, at least one end side in an axial direction of which is open; and
        (b) a plurality of nail portions which are formed at the opening end of the cylinder portion,
    a movable core that is housed movably in the axial direction in an inner periphery of the coil;
    a fixed core that is set at the opening end side of the casing;
    a valve body that has a hollow shape and is fixed to the opening end of the casing together with the fixed core by bending inwards and deforming the nail portions; and
    a spool valve body that moves in the axial direction in the valve body according to the movement in the axial direction of the movable core, and
    each of the plurality of nail portions being provided with
        (c) a wide width portion formed at a root side of the nail portion;
        (d) a narrow width portion formed at a top edge side of the wide width portion in a substantially central location, in a width direction, of the wide width portion; and
        (e) a stepped portion formed between the wide width portion and the narrow width portion, and
    the stepped portion being positioned at a substantially same position as an outer edge of a flange portion of the valve body which abuts on the fixed core from the axial direction, or being positioned between the outer edge of the flange portion of the valve body and an abutting portion of the valve body on the fixed core.

2. The electromagnetic valve as claimed in claim 1, wherein:
    the cylindrical portion of the casing is made by rounding a plate member and joining opposing ends in circumferential direction of the plate member together.

3. The electromagnetic valve as claimed in claim 1, wherein:
    the casing is made of magnetic material.

4. The electromagnetic valve as claimed in claim 1, wherein:
    an enlarged width portion whose width is greater than the narrow width portion is formed at a top edge of the narrow width portion.

5. An electromagnetic valve comprising:
    an annularly-wound coil;
    a casing that encircles an outer peripheral side of the coil and has
        (a) a cylinder portion, one end side in an axial direction of which is open; and
        (b) a plurality of nail portions which are formed at the opening end of the cylinder portion, each of the nail portions having a wide width portion formed at a root side of the nail portion and a narrow width portion formed at a top edge side of the wide width portion in a substantially central location, in a width direction, of the wide width portion,
    a movable core that is housed movably in the axial direction in an inner periphery of the coil;
    a fixed core that is set at at least the opening end of the casing;
    a valve body that has a hollow shape and is fixed to the opening end of the casing together with the fixed core by bending inwards and deforming the nail portions; and
    a spool valve body that moves in the axial direction in the valve body according to the movement in the axial direction of the movable core, and
    each of the nail portions having a structure in which the narrow width portion is bent inwards and deformed more easily than a root part of the nail portion with the top edge side, positioned at a substantially same position as a flange portion of one end portion of the valve body which abuts on the fixed core from the axial direction, of the wide width portion being a bending position.

* * * * *